United States Patent [19]
Nagai et al.

[11] 3,856,843
[45] Dec. 24, 1974

[54] PROCESS FOR PRODUCING SILYLETHER

[75] Inventors: Yoichiro Nagai; Iwao Ojima, both of Sagamihara, Japan

[73] Assignee: Sagami Chemical Research Center, Japan

[22] Filed: June 13, 1973

[21] Appl. No.: 369,596

[30] Foreign Application Priority Data
June 13, 1972  Japan................................ 47-58256
Aug. 2, 1972  Japan................................ 47-76890
Sept. 12, 1972  Japan................................ 47-90947

[52] U.S. Cl.......... 260/448.8 R, 260/631.5, 252/431
[51] Int. Cl. .............................................. C07f 7/18
[58] Field of Search.................. 260/448.8 R, 631.5; 252/431

[56] References Cited
UNITED STATES PATENTS

| | | | |
|---|---|---|---|
| 3,394,162 | 7/1968 | Braun........................... | 260/448.8 R |
| 3,433,819 | 3/1969 | Braun........................... | 260/448.8 R |
| 3,484,470 | 12/1969 | Pittman et al............ | 260/448.8 R X |

*Primary Examiner*—Patrick P. Garvin
*Assistant Examiner*—Paul F. Shaver
*Attorney, Agent, or Firm*—Oblon, Fisher, Spivak, McClelland & Maier

[57] ABSTRACT

A silylether is produced by reacting a carbonyl compound with an organosilicon hydride in the presence of a phosphine halo-rhodium catalyst.

7 Claims, No Drawings

PROCESS FOR PRODUCING SILYLETHER

BACKGROUND OF THE INVENTION

1. Field of the Invention

This invention relates to a process for producing a silylether. More particularly, it relates to a process for producing a silylether by reacting a carbonyl compound with an organosilicon hydride.

2. Description of the Prior Art

Silyl groups have been widely studied as protecting groups for some functional groups which are sensitive to certain chemical reactions. More specifically, silyl groups have been found to be useful as protecting groups in the production of peptides, nucleo acids, and nucleotides. In the keto-enol equilibrium shown in the following equation,

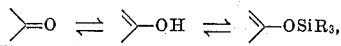

the normally unstable and reactive enol form can be stabilized by protection with a silyl group as shown in the equation. The silyl enolether formed can be either directly acetylated or benzoylated which are typical of the various types of reaction which occur with vinylalcohol compounds. The double bond of the silyl group protected enol is increased in reactivity because of electron donating abilities of the silyl group. Thus, the silyl group protected enol ethers as prepared by the process of the present invention and other processes, undergo a variety of reactions with various organic reagents and are particularly useful in the production of peptides, nucleo acids and nucleotides.

A number of processes are known for the production of silylethers by reacting a carbonyl compound with an organosilicon hydride. Some typical processes are described in the following sources:

1. Zinc chloride is used as the catalyst in the production of silyl-enol ethers. [Raymond Calas et al. Compt. rend. 251, 2987–9 (1960)].
2. Chloroplatinic acid is used as the catalyst in the production of silyl-enol ethers. [A. D. Petrov et al. Doklady Akad. Nauk S.S.S.R. 121 119–22 (1958)].
3. Special amine catalysts are used for the production of silyl-enol ethers. [H. O. House et al. J. Org. Chem. 34, 2324–2336 (1969)].

Process (1) has been considered to be the optimum process for producing silyl protected enol ether, however, process (1) requires high operational temperatures (about 100°–150° C), and long reaction periods (over about 15 hours). Also, when an aromatic ketone is used as a raw material, the yield of product substantially decreases, and when benzaldehyde is used, disproportionation of the product results. Thus, because of these disadvantages, it is difficult to use this process on an industrial scale.

It has been disclosed that process (2) applies only to the protection of $\alpha,\beta$-unsaturated aldehydes and ketones with silyl groups. However, chloroplatinec acid catalyst is quite expensive and a solvent should be used in the reaction. Furthermore, HCl is produced as a by-product in the reaction. These disadvantages preclude its use as a viable industrial process.

Process (3) requires very close control of operational procedures. Further, trimethylchlorosilane is used as the reagent, and it is very sensitive to moisture, thus requiring careful control of operational procedures. In addition, high boiling point polar solvents such as dimethylformamide (boiling point of 153° C) are required for the reaction. This makes separation and purification of the reaction product difficult. These disadvantages make it difficult to use process (3) in industrial scale operations.

A need, therefore, exists for a process for conveniently producing silyl group protected enol ethers in industrial scale procedures.

SUMMARY OF THE INVENTION

Accordingly, one object of this invention is to provide a process which is practical on an industrial scale, for producing a silylether by reacting a carbonyl compound with an organosilicon hydride without any of the disadvantages associated with the conventional processes.

Briefly, this object and other objects of this invention as hereinafter will become more readily apparent can be achieved by providing a process for producing silylethers in high yield by reacting a carbonyl compound with an organosilicon hydride in the presence of a phosphine halorhodium compound such as tris(triphenylphosphine) chlororhodium(I).

DESCRIPTION OF THE PREFERRED EMBODIMENTS

The silylethers produced by the process of this invention can be used as raw materials for various products such as water-repellent agents, silicon lacquers, plasticizers for siloxane polymers, polymer transparency improving agents and siloxane polymers. The silylethers are thermaly stable and have a sufficient vapor pressure so that they are easily analyzed by gas chromatographic and mass spectrographic techniques. The process of this invention can be applied to the protection of compounds containing an active hydrogen atom by the intermediate formation of trialkylsilyl protected compounds which can be measured by gas chromatographic, mass spectrographic analysis and the like. In conventional protection procedures, trimethylchlorosilane has been used as the source of the trimethylsilyl protecting group. Suitable carbonyl compounds which are used as the reactant of this invention include aliphatic aldehydes such as acetoaldehyde; aromatic aldehydes such as benzaldehyde; aliphatic ketones such as acetone; aromatic ketones such as acetophenone; $\alpha,\beta$-unsaturated ketones such as mesityloxide, and phenylvinylketone; $\alpha,\beta$-unsaturated aldehydes such as crotonaldehyde, cinnamaldehyde and the like. If an $\alpha,\beta$-unsaturated ketone is treated by the process of this invention, the silyl enol ether product can be selectively produced. The result is at variance with the results obtained from conventional reactions which use trimethylchlorosilane to react with the $\alpha,\beta$-unsaturated ketone.

Suitable terpene carbonyl compounds can also be used such as terpene ketones, terpene aldehydes and, especially, $\alpha,\beta$-unsaturated terpene carbonyl compounds having at least one double bond conjugated with the double bond of the enol tautomer of the carbonyl compound. Suitable terpene ketones include camphor ketone, menthone, and 3-enolamino camphor ketone. Suitable terpene carbonyl compounds having at least one double bond in addition to a carbonyl group conjugated with a double bond include terpene aldehydes such as citral, nonadienal, farnesol, perillylaldehyde, citrylideneacetaldehyde, citrylidenepropionaldehyde, cyclocitrylideneacetaldehyde, cyclocitrylidenepropionealdehyde; α-ionone, β-ionone, γ-ionone, carvone, phorone, camphorenalketones, pseudoionone, or the like.

The organosilicon hydride used as the other reactant in the reaction system of the process of this invention includes the trialkylsilanes such as triethylsilane, diethylmethylsilane, and tributylsilane; diarylalkylsilanes; diarylsilanes; arylalkylsilanes; and arylsilanes. Suitable alkyl groups include the lower alkyl groups having 1 – 7 carbon atoms. Suitable aryl groups include phenyl.

Suitable catalysts for promoting the reaction of this invention are the phosphine halorhodium complexes such as tris(triphenylphosphine) chlororhodium(I) which is the well known Wilkinson catalyst for the homogeneous catalytic hydrogenation, decarbonylation, oxidation and carbonylation of olefins. Heretofore, however, this compound has not been known to promote the hydrosilylation of carbonyl compounds.

In the process of this invention, the starting materials consisting of the carbonyl compound and the organosilicon hydride are mixed in the presence of the tris(triphenylphosphine)chlororhodium(I) catalyst, preferable under an inert gas atmosphere at temperatures ranging from ice temperatures to 50° – 80°C. Suitable reaction temperatures usually range from -5° to 80°C, preferably 0° to 80°C, while the amount of catalyst employed usually ranges from 0.01 – 1 mole percent, based on the carbonyl compound. Normally, substantially equivalent amounts of the organosilicon hydride are reacted with the carbonyl compound. However, the amounts of both reactants can be altered depending upon the degree of hydrosilylation desired. High yields of the product silylethers can be obtained by the process of the invention.

The silylether can be separated from the reaction solution by adding petroleum ether, ether, n-hexane, and the like to the solution and then filtering the precipitated catalyst. Silylethers of high purity can be obtained in high yeild by this procedure. If a terpene ketone or a terpene aldehyde is used as the carbonyl compound, the resulting terpene silylether can be readily converted to the terpene alcohol in high yield by hydrolyzing the silylether by treating the reaction mixture with an alcoholic alkali metal hydroxide solution such as potassium carbonate or sodium carbonate in an -acetone-methanol-water solution or a sodium alcoxide in alcohol such as sodium methoxide-methanol.

Having generally described this invention, a further understanding can be obtained by reference to certain specific examples which are provided herein for purpose of illustration only and are not intended to be limiting unless otherwise specified.

EXAMPLE 1

Into a flask was placed 1.40 g(12 mmol) of triethylsilane, 1.20 g (10 mmole) of acetophenone and 100 mg (1 mole percent) of $(Ph_3P)_3$ RhCl under a nitrogen atmosphere, and the mixture was stirred. The flask was heated at 80°C for 30 min in an oil bath. After the reaction, 50 ml of n-hexane was added to the reaction mixture and the precipitated catalyst was filtered. The filtrate was concentrated and distilled under reduced pressure to yield 2.29 g of methylphenyltriethylsiloxymethane having a boiling point of 90°C/0.8 mmHg. (yield 97 percent).

EXAMPLE 2

Into a flask was placed 0.98 g(10 mmole) of cyclohexanone and 1.16 g (10 mmole) of triethylsilane and then 20 mg. (0.2 mole percent) of $(Ph_3P_3)$ RhCl was added to the solution under a nitrogen atmosphere. The mixture was stirred at room temperature, and the ensuing exothermic reaction was completed in a several minutes. A 50 ml amount of n-hexane was added to the reaction mixture and the precipitated catalyst was filtered, and the filtrate was concentrated and distilled under reduced pressure to yield 2.10 g of cyclohexyltriethylsiloxymethane (yield 98 percent). Because the reaction proceeded quickly, and because of its exothermic nature, the reaction flask was cooled in an ice water bath.

EXAMPLE 3

Into a flask was placed 1.16 g (10 mmole) of triethylsilane, 0.98 g (10 mmole) of mesityloxide and 50 mg (0.5 mole percent) of $(Ph_3P)_3$ RhCl under a nitrogen atmosphere, and the flask was heated at 50° C for 15 min in an oil bath to complete the reaction. A 50 ml quantity of ether was added to the reaction mixture, and the precipitated catalyst was filtered. The filtrate was concentrated and distilled under reduced pressure to yield 2.00 g of α-methyl-β-isopropylvinyloxytriethylsilane having a boiling point of 94° C/14 mmHg. (yield 93.5 percent).

EXAMPLE 4

Into a flask was placed 1.16 g (10 mmole) of triethylsilane and 1.06 g (10 mmole) of benzaldehyde and 100 mg (1 mole percent) of $(Rh_3P)_3RhCl$ was added to the flask while the mixture was stirred. The flask was heated at 50° C for 30 min in an oil bath to complete the reaction. A 50 ml amount of ether was added to the reaction mixture and the precipitated catalyst was filtered. The filtrate was concentrated and distilled under reduced pressure to yield 1.89 g of benzyloxytriethylsilane having a boiling point of 130° C/17 mmHg. (yield 85 percent).

EXAMPLE 5

Into a mixture of 1.54 g (10 mmole) of l-menthone and 1.16 g (10 mmole) of triethylsilane, 100 mg of $(Ph_3P)_3RhCl$ was added with stirring and the solution was heated at 80° C for 1 hour. After the reaction was completed, 50 ml of n-hexane was added to the reaction mixture and the precipitated catalyst was removed by filtration. The filtrate was concentrated and distilled under reduced pressure to yield 2.05 g of menthoxytriethylsilane having a boiling point of 106° C/1.2 mmHg. (yield 76 percent).

EXAMPLES 6 – 11

In accordance with the process of Example 1, silylether compounds were produced under the conditions shown in Table I.

EXAMPLE 12

Into a flask was placed 2.60 g (10 mmole) of triphenylsilane and 0.70 g (10 mmole) of crotonaldehyde. A 50 mg (0.5 mole percent) amount of tris(triphenylphosphine)chlororhodium(I) was added thereto, and the solution was stirred. The reaction was smoothly conducted at 60° C for 30 minutes to complete the reaction. n-Hexane was added to the reaction mixture to precipitate the catalyst, and the filtrate was distilled under reduced pressure to yield 3.20 g of 1-triphenylsiloxy-but-1-ene having a boiling point of 166° C/0.45 mmHg. (yield 97 percent).

EXAMPLE 13

Into a flask was placed 1.30 g (10.7 mmole) of phenylmethyldihydrosilane and 0.72 g (10 mmole) of n-butyraldehyde, and the mixture was cooled on an ice water bath. A 10 mg (0.1 mole percent) amount of tris(triphenylphosphine) chlororhodium(I) was added thereto and the mixture was stirred. The reaction was exothermic and was completed in several minutes.

trihydroxysilane and 2.64 g (10 mmole) of cinnamaldehyde and the mixture was cooled on an ice water bath. A 10 mg (0.1 mole percent) amount of tris (triphenylphosphine) chlororhodium(I) was added thereto and the mixture was stirred. The reaction was exothermic and was completed in several minutes. n-Pentane was added to the reaction mixture and the precipitated catalyst was filtered and distilled under reduced pressure to yield 3.70 g of pure bis($\beta$-benzylvinyloxy) phenylsilane having a boiling point of 135° C/0.2 mmHg. (yield 99 percent).

EXAMPLES 15 – 22

In accordance with the process of Example 12, silylether compounds were produced under the condi-

TABLE I

| Example | Carbonyl compound | Reaction conditions | Product | Boiling point | Yield (percent) |
|---|---|---|---|---|---|
| 6 | $CH_3$<br>$>=O$<br>$CH_3$ | Room temp., 10 min | $CH_3$ H<br>$>-OSiEt_3$<br>$CH_3$ | 159° C. (760 mm. Hg) | 85 |
| 7 | $CH_3CH_2$<br>$>=O$<br>$Ph$ | 80° C., 30 min | $CH_3CH_2$ H<br>$>-OSiEt_3$<br>$Ph$ | 64° C. (0.12 mm. Hg) | 87 |
| 8 | $CH_3CH=CH-C-Ph$<br>$\quad\quad\quad\quad\quad\|\|$<br>$\quad\quad\quad\quad\quad O$ | 60° C., 30 min | $CH_3CH_2CH=C-Ph$<br>$\quad\quad\quad\quad\quad\|$<br>$\quad\quad\quad\quad Et_3SiO$ | 89° C. (0.2 mm. Hg) | 82 |
| 9 | $PhCH=CH-C-CH_3$<br>$\quad\quad\quad\quad\quad\|\|$<br>$\quad\quad\quad\quad\quad O$ | 60° C., 30 min | $PhCH_2-CH=C-CH_3$<br>$\quad\quad\quad\quad\quad\quad\|$<br>$\quad\quad\quad\quad\quad Et_3SiO$ | 105° C. (0.32 mm. Hg) | 80 |
| 10 | $CH_3CH=CHCHO$ | 60° C., 15 min | $CH_3CH_2CH=CHO\,SiEt_3$ | 79° C. (18 mm. Hg) | 95 |
| 11 | $PhCH=CHCHO$ | 60° C., 15 min | $PhCH_2CH=CHO\,SiEt_3$ | 155° C. (20 mm. Hg) | 96 | n-Pentane was added to the reaction mixture, and the precipitated catalyst was filtered and distilled under reduced pressure to yield 1.90 g of n-butyroxyphenylmethylsilane having a boiling point of 104° C/20 mmHg. (yield 98 percent).

EXAMPLE 14

Into a flask was placed 1.08 g (10 mmole) of phenyltions shown in Table II.

EXAMPLE 23

A mixture of 9.7 g (0.11 mole) of diethylsilane and 15.2 g (0.10 mole) of camphor was mixed with 10 mg (0.01 mole percent) of tris-(triphenylphosphine) chlororhodium (I) and the mixture was stirred while being cooled in an ice water bath.

TABLE II

| Example | Organosilicon hydride (mole) | Carbonyl compound (mole) | Reaction conditions | Catalyst (mole percent) | Product | Boiling point (° C./ mm. Hg) | Yield (percent) |
|---|---|---|---|---|---|---|---|
| 15 | $Ph_3SiH$ (1) | $CH_3$<br>$>=O$<br>$CH_3$<br>(1) | Reflux 2 hrs | 1.0 | $Ph_3SiOCH(CH_3)_2$ | 146° C. (0.5) | 98 |
| 16 | $PhMe_2SiH$ (1) | $CH_3$ H<br>$>$ $>$<br>$CH_3$ $C-CH_3$<br>$\quad\quad\|\|$<br>$\quad\quad O$<br>(1) | 50° C., 30 min | 0.5 | $(CH_3)_2CHCH=CCH_3$<br>$\quad\quad\quad\quad\quad\|$<br>$\quad\quad\quad\quad OSiMe_2Ph$ | 125° C. (20) | 98 |
| 17 | $PhMe_2SiH$ (1) | $PhCHO$ (1) | Room temp., 5 min. | 0.1 | $PhCH_2O\,SiMe_2Ph$ | 115° C. (1.2) | 94 |
| 18 | $Et_2SiH_2$ | $Ph$<br>$>=O$<br>$Ph$<br>(1) | do | 0.1 | $(Ph)_2CHO\,SiHEt_2$ | 132° C. (0.4) | 95 |

TABLE II—Continued

| Example | Organosilicon hydride (mole) | Carbonyl compound (mole) | Reaction conditions | Catalyst (mole percent) | Product | Boiling point (° C./mm. Hg) | Yield (percent) |
|---|---|---|---|---|---|---|---|
| 19 | Et₂SiH₂ (1) | PhCH=CHCOCH₃ (1) | 50° C., 10 min. | 0.1 | PhCH₂CH=C(CH₃)(OSiHEt₂) | 93° C. (0.6) | 85 |
| 20 | Ph₂SiH₂ (1) | ⬡=O (1) | Ice-water cooled, 10 min. | 0.1 | Ph₂HSiO—⬡ | 122° C. (0.13) | 98 |
| 21 | PhMeSiH₂ (1) | CH₃CH=CHCOPh (1) | Room temp., 10 min. | 0.1 | CH₃CH₂CH=C(Ph)(OSiHMePh) | 131° C. (0.9) | 90 |
| 22 | PhSiH₃ (1) | ⬡=O (2) | Ice-water cooled, 10 min. | 0.1 | PhHSi(O—⬡)₂ | 117° C. (0.1) | 92 |

The reaction was exothermic, and was complete in several minutes. (VPC measurement. Column-3 percent SE-30 on chromosorb W). A 100 ml quantity of ethanol and 1 g of KOH were added to the reaction mixture, and the mixture was refluxed for 30 minutes. After evaporating the ethanol solvent, the residue remaining was neutralized with dilute hydrochloric acid and the product was extracted with 200 ml of ether. The ether was evaporated and the product was purified by sublimation to yield 14.2 g (92 percent) of alcohol (m.p. 205°–207° C). The ratio of borneol to isoborneol was 9:91, according to NMR spectrographic analysis. The identification of the alcohol was also established by NMR analysis.

EXAMPLE 24

A mixture of 15.0 g (0.11 mole) of phenyldimethylsilane and 15.4 g (0.10 mole) of menthone was mixed with 500 mg (0.5 mole percent) of tris(triphenylphosphine) chlororhodium (I). The mixture was stirred and heated at 70° C in an oil bath. The reaction was completed within 30 minutes. The reaction mixture was hydrolyzed by a sodium methoxidemethanol solution, and the reaction mixture was extracted with ether. The extract was distilled under reduced pressure to yield 14.5 g (93 percent) of menthol having a boiling point of 88° C/15 mmHg. According to NMR spectrographic analysis, only menthol was present in the product obtained and not neomenthol.

EXAMPLES 25 – 34

In accordance with the process of Example 23, silylethers were produced and hydrolyzed to yield the alcohols under the conditions shown in Table III.

EXAMPLE 35

Under a nitrogen atmosphere, a mixture of 19.2 g (0.100 mole) of α-ionone and 12.0 g (0.103 mole) of triethylsilane was mixed with 100 mg (0.1 mole percent) of tris(triphenylphosphine)chlororhodium(I) and the mixture was heated at 50°C for 2 hours. Gas chromatographic analysis of the reaction product showed that the starting ketone material had completely reacted. The product silylether was separated by distillation and the structure of the silylether was confirmed by NMR analysis, IR analysis and elementary analysis. The boiling point was 119°C (0.4 mmHg).

A 200 ml amount of K₂CO₃-acetone-methanol-water mixture was added to the reaction mixture, and the mixture was refluxed for about 1.5 hours. Gas chromatographic analysis showed that substantial amounts of the silylenolether was converted to dihydro-α-ionone. Anhydrous magnesium sulfate was added to the product to dry it and the product was distilled under reduced pressure to yield 18.4 g of dihydro-α-ionone having a boiling point of 88°C/2.5 mmHg (yield 95 percent).

TABLE III

| Example | Organosilicon hydride | Terpene Ketone | Reaction Conditions (mole %) (catalyst) | Reaction Conditions (temp-) (time) | Product Ratio | Yield (%) |
|---|---|---|---|---|---|---|
| 25 | PhSiH₃ | camphor | 0.05 | room 15 min. | (borneol/isoborneol) 12/88 | 91 |
| 26 | PhMeSiH₂ | do. | 0.05 | room 5 min. | 25/75 | 94 |
| 27 | Ph₂SiH₂ | do. | 0.05 | room 5 min. | 27/73 | 93 |
| 28 | Et₃SiH | do. | 1.0 | 70°C 1 hr. | 57/43 | 90 |
| 29 | Et₃SiH | do. | 1.0 | n-hexane reflux 1 hr. | 70/30 | 90 |
| 30 | PhSiH₃ | menthone | 0.05 | room 30 min. | (menthol/neomenthol) 10/90 | 95 |
| 31 | Et₂SiH₂ | do. | 0.05 | room 5 min. | 15/85 | 95 |

TABLE III—Continued

| Example | Organosilicon hydride | Terpene Ketone | Reaction Conditions (mole %) (catalyst) | (temp-) (time) | Product Ratio | Yield (%) |
| --- | --- | --- | --- | --- | --- | --- |
| 32 | PhMeSiH$_2$ | do. | 0.05 | room 5 min. | 15/85 | 94 |
| 33 | Ph$_2$SiH$_2$ | do. | 0.05 | room 5 min. | 15/85 | 95 |
| 34 | Et$_3$SiH | do. | 1.0 | 70°C 30 min. | 36/64 | 92 |

EXAMPLE 36

In accordance with the process of Examples 35, 15.2 g (0.10 mole) of citral was reacted with 12.0 g (0.103 mole) of triethylsilane. The product silylenolether had a boiling point of 76°C(0.3 mmHg) and was hydrolyzed with a KHCO$_3$-acetone-methanol-water solution under refluxing conditions for 1 hour. The reaction mixture was dried with anhydrous magnesium sulfate and distilled to yield 14.8 g of citronellal having a boiling point of 95°C/21 mmHg (yield 96 percent).

EXAMPLE 37

In accordance with the process of Example 35, 19.2 g (0.10 mole) of β-ionone and 13.6 g (0.10 mole) of phenyldimethylsilane were mixed in the presence of tris(triphenylphosphine) chlororhodium(I). This mixture was reacted at 70°C for 3 hours. The product silylenolether had a boiling point of 143°C (0.4 mmHg) and was hydrolyzed with a K$_2$CO$_3$-acetone-methanol-water solution. The reaction product was dried with anhydrous magnesium sulfate. The mixture was distilled under reduced pressure to yield 17.8 g of α,β-dihydro-β-ionone having a boiling point of 121°C/16 mmHg (yield 93 percent).

Having now fully described the invention, it will be apparent to one of ordinary skill in the art that many changes and modifications can be made thereto without departing from the spirit or scope of the invention as set forth herein. Accordingly,

What is claimed as new and desired to be secured by letters Patent of the United States is:

1. A process for preparing a silyether which comprises reacting a carbonyl compound selected from the group consisting of aliphatic aldehydes, aromatic aldehydes, aliphatic ketones, aromatic ketones, terpene aldehydes, and terpene ketones with an organosilicon hydride selected from the group consisting of trialkylsilanes, dialkylsilanes, monoalkylsilanes, triphenylsilanes, phenyldialkylsialnes, diphenylalkylsilanes, diaphenylsilanes, phenylalkylsilanes and phenylsilanes in the presence of a tris (triphenylphosphine) chlororhodium catalyst.

2. The process of claim 1, wherein the carbonyl compound is selected from the group consisting of acetoaldehyde, benzaldehyde, acetone, acetophenone, mesityloxide, phenylvinylketone, crotonaldehyde, cinnamaldehyde, camphor ketone, menthone, 3-enolamino camphor ketone, citral, nonadienal, farnesol, perillylaldehyde, citrylideneacetaldehyde, citrylidenepropionaldehyde, cyclocitrylideneacetaldehyde, cycloitrylidenepropionealdehyde, α-ionone, β-ionone, γ-ionone, carvone, phorone, camphorenalketones and pseudo-ionone.

3. The process of claim 1, wherein the alkyl portion of the silanes is a lower alkyl group having 1 – 7 carbon atoms.

4. The process of claim 1, wherein the tris(triphenylphosphine) chlororhodium catalyst is added to said carbonyl compound and said organosilicon hydride in amounts ranging from 0.01 – 1.0 mole percent based on said carbonyl compound.

5. The process of claim 1, wherein said carbonyl compound reacts with trialkylsilane in the presence of tris(triphenylphosphine) chlororhodium.

6. The process of claim 1, wherein a terpene alcohol is prepared by first preparing a silyether by reacting a terpene ketone with said organosilicon hydride in the presence of tris(triphenylphosphine) chlororhodium(I) and then hydrolyzing said prepared silyether.

7. The process of claim 1, wherein an α,β-unsaturated terpene carbonyl compound is reacted with an organosilicon hydride in the presence of tris(triphenylphosphine) chlororhodium and the product is hydrolyzed.

* * * * *